United States Patent
Yamaguchi

[11] Patent Number: 5,981,898
[45] Date of Patent: Nov. 9, 1999

[54] METHOD OF CONTROLLING ELECTRODE PRESSURE APPLICATION FORCE IN AN ELECTRIC GUN

[75] Inventor: Teruzo Yamaguchi, Ayase, Japan

[73] Assignee: Obara Corporation, Tokyo, Japan

[21] Appl. No.: 08/902,715

[22] Filed: Jul. 30, 1997

[30] Foreign Application Priority Data

Apr. 28, 1997 [JP] Japan .................................. 9-122807

[51] Int. Cl.⁶ .................................................. B23K 11/10
[52] U.S. Cl. ........................................ 219/86.41; 219/91.1
[58] Field of Search .......................... 219/86.25, 86.33, 219/86.51, 86.41, 91.1, 91.2, 89, 90; 364/474.12, 474.06; 318/432, 434, 626, 568.22

[56] References Cited

U.S. PATENT DOCUMENTS

| | | | |
|---|---|---|---|
| 5,340,960 | 8/1994 | Takasaki et al. | 219/86.7 |
| 5,484,975 | 1/1996 | Itatsu | 219/86.7 |
| 5,582,747 | 12/1996 | Sakai et al. | 219/86.41 |

FOREIGN PATENT DOCUMENTS

| | | |
|---|---|---|
| 2-6081 | 1/1990 | Japan . |
| 6-312273 | 11/1994 | Japan . |
| 6-312274 | 11/1994 | Japan . |

*Primary Examiner*—Gregory Mills
*Attorney, Agent, or Firm*—Flynn, Thiel, Boutell & Tanis, P.C.

[57] ABSTRACT

There is provided a method of controlling an electrode pressure application force in an electric gun provided with the electrode at the tip end of a movable arm which is driven by an electric motor comprising steps of setting a limit torque of the electric motor in advance, continuously measuring and storing an arriving position of the electrode at the tip end of the movable arm when the electric motor is driven, calculating an average value of groups of data of the stored arriving position, and continuously controlling to correct the arriving position to average value.

7 Claims, 2 Drawing Sheets

METHOD OF CONTROLLING ELECTRODE PRESSURE APPLICATION FORCE IN AN ELECTRIC GUN

BACKGROUND OF THE INVENTION

1. Field of the Invention

The present invention relates to a method of controlling pressing force applied from an electrode to a workpiece (hereinafter referred to as electrode pressure application force) in an electric gun provided with the electrode at the tip end of a movable arm which is driven by an electric motor.

2. Description of Related Art

As a conventional method of controlling electrode pressure application force in an electric gun provided with the electrode at the tip end of a movable arm which is driven by an electric motor, an open loop control system by controlling the torque of the electric motor has been normally carried out.

For example, an electric gun is disclosed in JP-A 6-312273. In this application, a method of controlling electrode pressure application force is carried out in the following manner. One electrode is moved to a target position by a motor having a position detector, and a workpiece is clamped, pressed and held between one electrode and another electrode which are paired at a position where the electrodes and the workpiece contact. The current of the motor necessary for generating given pressure application force is measured at a plurality of spots, and transformation function and an inverse function thereof are prepared based on the group of currents of the motor. Then a motor current instruction value is calculated by an arbitrary setting pressure application force in a pressure application current instruction circuit, and an actual application force is calculated in response to a motor current signal which is fed back so as to convert from a welding motor current value to an actual pressure application force, wherein the amount of protrusion of one electrode is corrected when there is a difference between the arbitrary set application force and the calculated actual pressure application force.

However, in the prior art set forth above, the pressure application force is finally checked based on the motor current value which causes a problem that the accurate pressure application force is not checked owing to a delicate frictional resistance in mechanical parts between the motor to the electrode or change of conversion efficiency.

SUMMARY OF THE INVENTION

The present invention has been made in view of the prior art problems set forth above, and it is an object of the present invention to provide a method of controlling an electrode application force in a welding gun capable of obtaining a steady pressure application force which is needed to be stable as much as possible and is less dispersed by conforming a present current value to an average current value of the electrode at the position where it applies continuously a pressure application force to a workpiece so as to perform the steady welding operation.

To achieve the above object, the method of controlling an electrode pressure application force in an electric gun provided with the electrode at the tip end of a movable arm which is driven by an electric motor comprising steps of setting a limit torque of the electric motor in advance, continuously measuring and storing an arriving position A of the electrode at the tip end of the movable arm when the electric motor is driven, calculating an average value B of groups of data of the stored arriving position A, and continuously controlling to correct the arriving position A to accord with the average value B.

DETAILED DESCRIPTION OF THE INVENTION

A method of controlling an electrode pressure application force in a electric gun according to a preferred embodiment of the invention will now be described with reference to FIGS. 1 and 2.

Figure 1:
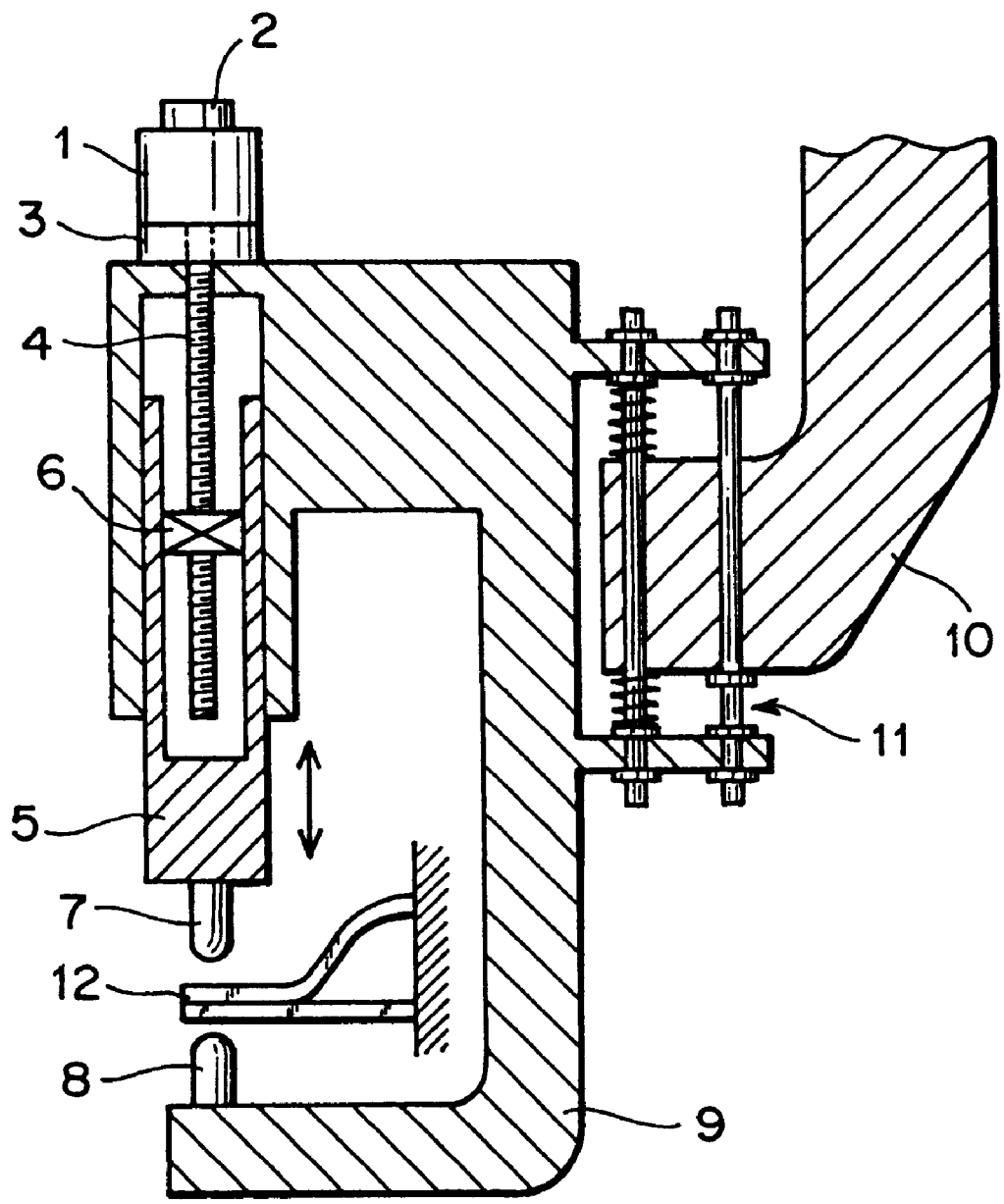
FIG. 1 is a schematic cross-sectional view of an electric gun for explaining a method of controlling an electrode pressure application force according to a preferred embodiment of the invention.

In FIG. 1, the electric gun comprises an electric motor 1, an encoder 2 disposed on the electric motor 1, a reduction gear 3 coupled with an output shaft of the electric motor 1, a lead screw 4 coupled with the reduction gear 3, a nut 6 fixed to a movable arm 5, the nut 6 being threaded into the lead screw 4, a first electrode 7 attached to the tip end of the movable arm 5, a second electrode 8 disposed at the position opposite to the electrode 7, and a fixed arm 9 to which the second electrode 8 is attached and which is coupled with a wrist 10 of a robot via an equalizer 11. The reduction gear 3 is disposed on the upper portion of the fixed arm 9.

When the electric motor 1 is driven in a state where the electric gun is moved by the robot while the second electrode 8 attached to the fixed arm 9 is brought into contact with a workpiece 12, the rotation of the electric motor 1 is transmitted to the lead screw 4 via the reduction gear 3, so that the movable arm 5 is moved toward the workpiece 12 via the nut 6 of the lead screw 4, then the electrode 7 at the tip end of the movable arm 5 is brought into contact with the workpiece 12 so as to apply the pressure application force to the workpiece 12 and the electric motor 1 stops the lowering of the electrode 7 at the position corresponding to the current (torque) applied thereto. The position of the electrode 7 at this time is measured by and stored in the encoder 2.

When the stopped position of the electrode 7 is regarded as a desired pressure application position to supply the welding current from the electrode 7 to the workpiece 12, the workpiece 12 is subject to welding. After the workpiece 12 is welded, the electric motor 1 is reversely rotated to move the electrode 7 backward to be away from the workpiece 12.

Meanwhile, although a limit torque or current is set or supplied to the electric motor 1 in advance, the power from the electric motor 1 is transmitted to the electrode 7 through the reduction gear 3, the lead screw 4 and other components. During the transmission of the power of the electric motor 1 to the electrode 7, there occurs the dispersion of the pressure application force of the electrode 7 toward the workpiece 12 owing to a frictional resistance and a loss of power conversion efficiency, and the bending of the fixed arm 9 by the pressure applied to the workpiece 12. The dispersion of the pressure application force impedes the uniformity of the welding quality, and hence the pressure application force is needed to be uniform as much as possible.

Figure 2:
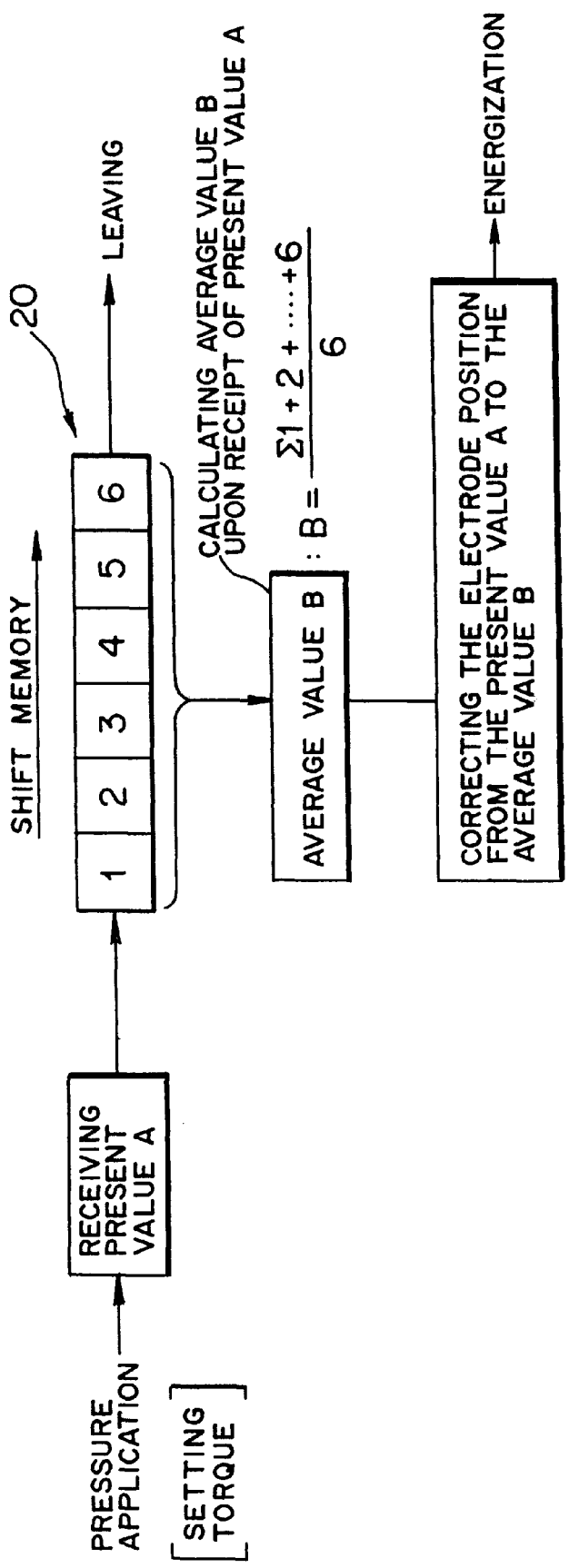
FIG. 2 is a block diagram for explaining the method of controlling an electrode pressure application force.

Accordingly, the method of controlling an electrode pressure application force is employed by the present invention as shown in FIG. 2. That is, the bending of the fixed arm 9 generally has a fixed proportional relation relative to the pressure application force. First the torque (current) to be applied to the electric motor 1 is selected so as to give a desired pressure application force to the workpiece 12, and then the electric motor 1 is driven by this limit torque. A shift memory 20 for storing therein the position of the electrode 7 is, for example, provided in a timer, not shown. At this time, a position A where the electrode 7 arrives by the current I applied thereto is stored in a block 1 of a shift memory 20 as a present value. Suppose that the shift memory 20 has six blocks, the data stored in the block 1 is transferred to a block 2, then the data in each block is sequentially transferred to a next block so that the data stored in a block 5 is transferred to a last block 6 and the data stored in the last block 6 is discharged or left.

In such a manner, if the data of the arriving position A of the electrode in the six blocks of the shift memory 20 are updated and stored, an average value B thereof is calculated. The calculation of the average value B is performed by a simple average or a square average or a probable means which is appropriate corresponding to the number of data. For example, if the average value B is calculated by the simple average, the position of the electrode is corrected so that the arriving position A becomes the average value B immediately before the welding operation (e.g. the arriving position A is forcibly changed to the average value B using pulses).

The present value A of the electrode in the subsequent welding operation is stored in the block 1 of the shift memory 20, and the data stored in the block 1 is transferred to the block 2, and successively the data in each block is transferred to the next block, and the data stored in the block 5 is transferred to the last block 6, and finally the data stored in the last block 6 is left. Subsequently, the average value B of the data in six blocks of the shift memory 20 is calculated, then the position of the electrode is corrected to change the present position A to the average value B, thereafter the welding operation is performed. In such a manner, the calculations or judgment and correction is repeated every welding operation, thereby obtaining a pressure application force which is steady as much as possible and is less dispersed.

In such a manner, the present value A is corrected subsequently so as to automatically fit for the change of pressure application position owing to the consumption of the electrode.

In the method set forth above, since the position of the electrode immediately before the welding operation is corrected to the average value B stored in the shift memory, an appropriate average value is not calculated if the shift memory 20 is filled with the last data. Accordingly, to cope with this, the present value A which is obtained only at the start of control may be stored in all the blocks of the shift memory 20.

According to the method of the present invention as set forth above in detail and disclosed in the attached claim, it is possible to obtain a pressure application force which is steady and is less dispersed so as to perform the steady welding operation by appropriately controlling the present position of the electrode without directly detecting the pressure application force by the electric motor.

What is claimed is:

1. A method of controlling an electrode pressure application force in an electric gun provided with an electrode at a tip end of a movable arm which is driven by an electric motor, comprising steps of setting a limit torque of the electric motor prior to driving said motor, continuously measuring and storing an arriving position of the electrode at the tip end of the movable arm when the electric motor is driven, calculating an average value of groups of data of the stored arriving position, and continuously controlling said motor to correct the arriving position to the average value.

2. A method of controlling an electrode pressure application force in an electric welding gun provided with an electrode at a tip end of a movable arm which is driven by an electric motor, comprising the steps of:

setting a limit torque for the electric motor;

measuring and storing an arriving position of the electrode at the tip end of the movable arm when the electric motor is driven to its limit torque;

calculating an average value from a group of data representing stored arriving positions; and controlling the motor to correct the arriving position to the average value;

whereby the electrode pressure application force remains steady during repeated welding operations despite consumption of the electrode.

3. The method of controlling the electrode pressure application force according to claim 2, wherein the corrected arriving position of the electrode provides a steady pressure application force without direct measurement of the pressure application force.

4. The method of controlling electrode pressure application force according to claim 2, wherein the group of data represents six stored arriving positions.

5. The method of controlling electrode pressure application force according to claim 2, wherein the calculation of the average value comprises square averaging of the group of data.

6. The method of controlling electrode pressure application force according to claim 2, wherein the calculations are repeated every welding operation.

7. The method of controlling electrode pressure application force according to claim 2, wherein the arriving position of the electrode for a welding operation is stored as one of the group of data, and the others of the group of data are successively shifted with one of the others being removed.

\* \* \* \* \*